United States Patent [19]
Lo et al.

[11] Patent Number: 5,054,063
[45] Date of Patent: Oct. 1, 1991

[54] DISPOSABLE SANITARY TELEPHONE COVER

[76] Inventors: Josephine N. Lo; Peter P. Chow, both of 2317 Byrnes Rd., Minnetonka, Minn. 55343

[21] Appl. No.: 292,544

[22] Filed: Dec. 30, 1988

[51] Int. Cl.[5] .............................................. H04M 1/00
[52] U.S. Cl. ..................................... 379/452; 379/439
[58] Field of Search ............... 379/451, 452, 437, 439; 381/189, 182, 183

[56] References Cited

U.S. PATENT DOCUMENTS

| | | | |
|---|---|---|---|
| 2,078,877 | 4/1937 | Hoyland | 379/451 |
| 2,450,703 | 10/1948 | Weisbrad | 379/452 |
| 2,507,375 | 5/1950 | Hartwell et al. | 379/452 |
| 2,593,382 | 4/1952 | Zimmermann | 379/452 |
| 2,669,610 | 2/1954 | Dent | 379/452 |
| 2,938,967 | 5/1960 | Guardino | 379/452 |
| 3,169,171 | 2/1965 | Wachs et al. | 379/452 |
| 3,962,555 | 6/1976 | Efaw | 379/451 |
| 4,546,217 | 10/1985 | Frehn | 379/452 |
| 4,570,038 | 2/1986 | Tinelli . | |
| 4,819,264 | 4/1989 | Lemley | 379/452 |

FOREIGN PATENT DOCUMENTS

| | | | |
|---|---|---|---|
| 2592263 | 6/1987 | France | 379/452 |
| 1528572 | 10/1974 | United Kingdom | 379/452 |
| 2180752 | 4/1987 | United Kingdom | 379/452 |

*Primary Examiner*—Jin F. Ng
*Assistant Examiner*—Jason Chan
*Attorney, Agent, or Firm*—Fredrikson & Byron

[57] ABSTRACT

A sound-permeable disposable sanitary telephone cover attachable to the sound transmitting portions of a telephone for protecting a user from contacting the sound transmitting portions of the telephone and being exposed bacteria and other contagious and infectious agents carried by the telephone. The telephone cover comprises a disposable sheet sized to cover the sound transmitting members of a telephone, the sheet including a number of layers of material bonded together. One or more layers comprising the sheet may be water impermeable and may include a disinfectant to deter the transfer therethrough of bacteria and other germs. The cover is attached to a telephone through the use of an adhesive.

7 Claims, 2 Drawing Sheets

DISPOSABLE SANITARY TELEPHONE COVER

FIELD OF THE INVENTION

The invention relates to telephone covers, and more particularly to a disposable sanitary telephone cover for covering the mouthpiece and earpiece of telephone handsets to protect the user from the spread of germs.

BACKGROUND OF THE INVENTION

Telephone users commonly use telephones in places which are generally accessible to multiple users, the telephones being subjected to fairly frequent us by relatively large numbers of people. Phones come into close contact with the ear and mouth areas of numerous different users and create a risk that harmful bacteria and germs ma be transferred from one user to another. It is difficult for a telephone user to clean the mouthpiece and earpiece of a telephone receiver prior to use to remove harmful bacteria, germs and other contagious and infectious agents that may be present. Therefore, a need exists for a portable, disposable sanitary cover for telephone receivers that is easily attachable and removable and will prevent the user from contracting bacteria or the like from telephones.

SUMMARY OF THE INVENTION

The invention relates to a sound permeable disposable sanitary telephone cover attachable to a telephone handset for protecting a user from contacting the handset and being exposed to bacteria carried by the handset. The invention comprises a disposable sheet sized to cover a sound transmitting member of a telephone such as the ear or speaker portion. The sheet includes a number of layers, one of the layers preferably comprising cellophane or other water impermeable thin material and the other layer comprising soft paper or plastic material, the two layers being bonded together by a bonding agent such as a strong adhesive. The sheet further includes means for removably attaching the device to a telephone. One or more of the layers comprising the sheet may include a disinfectant such as iodine to deter the propagation of bacteria and other germs.

DETAILED DESCRIPTION OF THE PREFERRED EMBODIMENT

Figure 1:
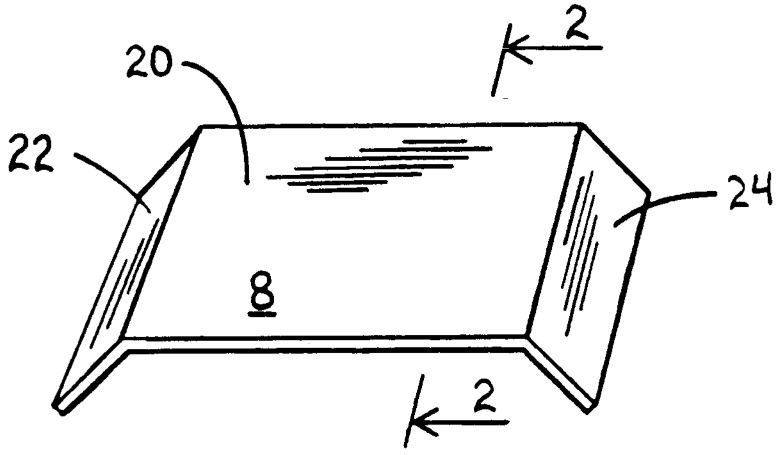
FIG. 1 is a perspective view of a telephone cover of the invention.

Referring to the drawings, particularly FIG. 1, the sound permeable sanitary telephone cover depicted as 8 is applied to the sound transmitting portions of a telephone receiver to prevent user contact with the telephone to prevent bacteria, saliva, and other unwanted substances from being transferred from one user to another. The pad may be configured in any suitable shape enabling it to protectively cover the sound transmitting portions of a telephone Generally when a telephone is in use, both of the sound transmitting portions of the telephone, the mouthpiece and the earpiece, come into intimate contact with the user. The telephone is a utility device used by many people and its surfaces may become easily contaminated and inhabited by contagious and infectious agents. These infectious agents can easily transfer to the mucous membranes of the ear, mouth and nose during contact with the telephone receiver.

The sanitary cover 8 of the invention is disposable and easily attached to and removable from the sound transmitting portions of the telephone. The cover 8 may be left in place on the telephone and used a number of times by the same user or it may be easily removed and discarded after use. The disposable nature of the telephone cover prevents bacteria from being retained on the cover which could easily contaminate non-disposable telephone covers which are generally used more than once.

It should be noted that the earpiece and mouthpiece portions of the telephone are generally formed of substantially similar shape. Accordingly, similar or identical sanitary covers may be used on either the mouthpiece or earpiece of the telephone.

A preferred embodiment of the cover is shown in FIG. 1 wherein the rectangular cove 8 includes a center portion 20 and tabs 22,24 which extend from opposite ends of the cover, the tabs being bendable so that they may be carried at an angle with respect to the center portion 20.

Figure 3:
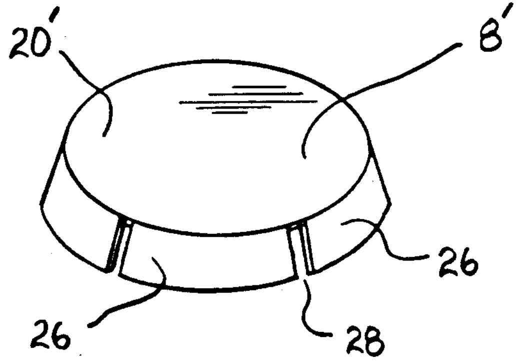
FIG. 3 is an alternative embodiment of the telephone cover of the invention.

In another embodiment of the invention, the telephone cover 8′ is configured in a circular arrangement as shown in FIG. 3, and includes a center portion 20′ and an outer flange 26 bendable with respect to the center portion 20′ to closely contact the sound transmitting portion of a telephone. A bonding means such as an adhesive may be carried by the underside of 20′ or by the flange for removably attaching the device to the telephone. This embodiment may further include slots 28 radially extending through a portion of the flange 26 to aid the device in bending to closely contact and adhere to the sound transmitting portions of a telephone. Primes (′) are used to show parts similar to those shown in FIG. 1.

Figure 2:
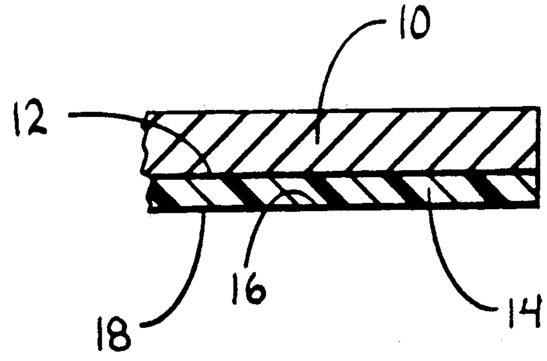
FIG. 2 is a cross-sectional view of the telephone cover of FIG. 1 taken along line 2—2 thereof.

As shown in FIG. 2, the cover preferably comprises a plurality of layers which may be mechanically bonded together, using, for example, a suitable adhesive. A first layer 14 may comprise a non-bacteria permeable material adapted to contact the sound transmitting portion of a telephone. Any suitable material may be used for this layer that can be shaped to cover a telephone receiver, such as a cellophane-type material.

Cellophane or similar material may be chosen for use as the first layer in the device of the invention because of its liquid impermeability characteristics, thinness, mechanical strength and its favorable sound transmitting characteristics. In one embodiment, the disinfectant applied to the cover 8 may be a thin layer of iodine which is a dry disinfectant. Other suitable disinfectants may be used alternatively or in combination with one another.

In a preferred embodiment, as shown in FIG. 2, the first layer further comprises an anti-microbial substance 16 dispersed over all or a portion thereof that substantially prevents the penetration of bacteria and other unwanted substances therethrough. The anti-microbial substance may be sprayed onto the layer or it may be integrally formed with the first layer. A second layer 10 of the cover may comprise a soft material bonded to the first layer a by an adhesive 12 and adapted to contact the, skin of a telephone user. This soft layer 10 may comprise cotton, cotton fabric, paper, plastic or another suitable material which is comfortable when placed against the skin. The soft layer 10 may further include a scent and a disinfectant. The mechanical bonding of the first to the second layer may be accomplished by any suitable means such as thermal welding, ultrasonic welding, mechanical adhesion and the like.

Figure 4:
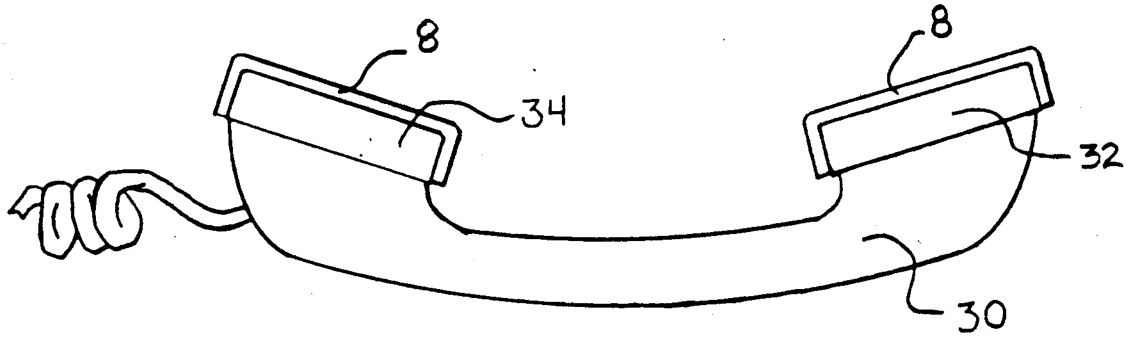
FIG. 4 is an elevational view of a telephone receiver showing a telephone cover of the invention attached thereupon.

FIG. 4 shows the telephone covers of the invention carried upon the sound receiving and transmitting portions 32, 34 of a telephone receiver 30.

If desired, the sanitary disposable telephone cover 8 or 8' may further include perforations through the center portion 20 to improve penetration of a users voice through the cover. However, perforations are not necessary to have clear sound transmission.

The telephone covers of the invention, as previously described, may be grouped as a pad comprising a plurality of individual covers stacked upon one another. Preferably the covers are stacked facing the same direction, the adhesive carried on one side of each cover functioning to adhere the cover to an adjacent cover. Telephone covers may be easily removed from the stack for use. The pad is preferably sized to be portable and easily transported.

In yet another embodiment the telephone covers of the invention may be made of materials on which advertisements have been printed so that when the cover is attached to the phone, phone numbers and the like can be read by the user The materials used to print the advertisements on the cover must comprise a material that does not interfere with the ability of the cover to prevent transmission of bacteria and the like.

While a preferred embodiment of the present invention has been described, it should be understood that various changes, adaptations and modifications may be made therein without departing from the spirit of the invention and the scope of the appended claims.

What is claimed is:

1. A portable pad of disposable sanitary covers for sound receiving and transmitting portions of telephones comprising:

a plurality of sanitary covers, each sanitary cover having a first layer having a water impermeable material adapted to contact the sound transmitting portions of a telephone; a second layer comprising a soft material adapted to contact the skin of a user; means for bonding the first and second layers closely together; and adhesive material carried on the side of the first layer disposed away from the second layer for removably attaching the cover to a sound receiving or transmitting portion of a telephone;

each of the sanitary covers being removably attached to another sanitary cover.

2. The portable pad of claim 1 wherein the first layer of each of the sanitary covers comprises a plastic cellophane sheet.

3. The portable pad of claim 1 wherein the soft material of each of the sanitary covers is selected from the group of cotton, paper and plastic.

4. The portable pad of claim 1 further comprising an anti-microbial material positioned on each of the sanitary covers to prevent penetration of bacteria or virus therethrough.

5. The portable pad of claim 1 wherein the first layer of each sheet is bacteria impermeable.

6. The portable pad of claim 4 wherein the anti-microbial material comprises iodine.

7. The portable pad of claim 1 wherein the second layer of each of the sanitary covers includes printed matter at a position viewable by a user of the sanitary cover.

* * * * *